April 24, 1956 D. LEED 2,743,362

AUTOMATIC FREQUENCY CONTROL

Filed May 24, 1951 5 Sheets-Sheet 1

INVENTOR
D. LEED
BY
H. A. Burgess
ATTORNEY

INVENTOR
D. LEED
BY H. A. Burgess
ATTORNEY

April 24, 1956 D. LEED 2,743,362

AUTOMATIC FREQUENCY CONTROL

Filed May 24, 1951 5 Sheets-Sheet 3

INVENTOR
D. LEED
BY H. A. Burgess
ATTORNEY

April 24, 1956

D. LEED 2,743,362

AUTOMATIC FREQUENCY CONTROL

Filed May 24, 1951

5 Sheets-Sheet 4

INVENTOR
D. LEED
BY H. A. Burgess
ATTORNEY

INVENTOR
D. LEED
BY
H. A. Burgess
ATTORNEY

United States Patent Office 2,743,362

Patented Apr. 24, 1956

2,743,362

AUTOMATIC FREQUENCY CONTROL

Daniel Leed, New York, N. Y., assignor to Bell Telephone Laboratories, Incorporated, New York, N. Y., a corporation of New York Application May 24, 1951, Serial No. 228,097

12 Claims. (Cl. 250—36)

This invention relates generally to automatic frequency control and more particularly to automatic frequency control in which servo control techniques are employed.

For many purposes, it is often desirable that a predetermined relation be maintained between two frequencies. For example, for test purposes, it might be necessary to maintain a "slave" or controlled frequency a precise number of cycles above a "master" or reference frequency which is, in turn, swept over a relatively wide spectrum. If the slave frequency is to track the master frequency over a sufficiently wide spectrum, it may be desirable to vary the slave frequency by mechanical means. Servo control techniques are ideally suited to this purpose.

According to a commonly accepted definition, a servomechanism is a power-amplifying device in which the amplifying element driving the output is actuated by the difference between the input and the output. The term "error" is normally used to designate the difference between the servo input and the servo output.

In a typical control servo, an electric motor is used as the amplifying or power-supplying element and a quantity controlled by its output is compared with the servo input. The error is supplied to the servomotor in the form of an electric current and, when actuated by the error signal, the motor operates in a direction to restore equality between the servo output and the servo input.

In a specific automatic frequency control system, a servomotor may be used to regulate the setting of a tuning condenser and thereby to control the frequency of a slave oscillator. The slave frequency is compared with the master frequency and any departure of the two from a predetermined relation is detected. A suitable transducer converts the error into an electric current, one or more components of which are utilized to actuate the motor. Through appropriate gear reduction means, the servomotor is linked mechanically to the tuning condenser of the slave oscillator and, as the proper relationship between the slave and master frequencies is restored, the error signal decreases. Though the master frequency may vary over an extremely wide range, the automatic control is expected to maintain the intended relationship between master and slave frequencies at all times.

However, certain problems present themselves in such a system, one of the most serious of these being the presence of backlash in the servomotor and associated gear train. Even a small amount of backlash produces a substantial indeterminacy in the slave frequency. In addition, backlash may lead to instability, since, in effect, it results in intermittent opening of the servo control loop. This, in conjunction with the storage of energy in the moving parts of the motor and the associated gear train, tends to cause mechanical oscillations of the servomotor shaft. In an automatic frequency control system of the type under consideration, an unwanted frequency modulation of the slave oscillator results. The seriousness of the backlash problem increases with the precision demanded of the control servo. In high gain precise servos it sets the limit on obtainable accuracy.

A further adverse effect which may be caused by backlash is the complete loss of closed loop control or "synchronization" when certain types of error signal transducers are used. If the transducer introduces a component corresponding to the time integral of error, automatic control may be lost if, due to the inherent indeterminacy of the slave frequency, the frequency error persists long enough for the limited range of the transducer to be exceeded. Once the error is out of range covered by the transducer, the transducer no longer supplies an error signal to the servomotor and the slave frequency ceases to track the master frequency.

A related problem arising in an automatic frequency control system of the type described is that of making the slave oscillator seek synchronism automatically. If the slave oscillator is initially out of synchronism with the master frequency the operation of the servo control system will normally not bring the two frequencies into synchronism, since the error will be so large that it is out of the range covered by the error signal transducer. To initiate the process of synchronization, it is usually necessary that some means be provided to make the servomotor turn in the absence of synchronization and thus to sweep the frequency range of the slave oscillator. The automatic scan circuits known in the art tend, however, to be relatively complex.

A principal object of the present invention is to provide means permitting the use of gear reductions in servos which would otherwise be unstable or inoperative without such means because of the remnant backlash.

Another object of the present invention is to provide more precise control of the slave frequency in an automatic frequency control system of the type described than would be available with mechanical control alone.

A further object of the invention is to avoid the unwanted modulation of the slave frequency which tends to be introduced by backlash in the servomotor and the associated gear train.

Still another object is to prevent backlash from causing the slave and master frequencies to drop out of synchronism.

A further object is to provide a simplified technique for causing the slave oscillator to seek its lock-in frequency automatically whenever it is out of synchronism with the master frequency.

A feature of the present invention is the presence of an electronic control circuit supplementing the mechanical servo loop in an automatic frequency control system of the type described. The electronic control loop, being closed continuously, serves to overcome the effects of backlash. Greater precision in the frequency setting of the slave oscillator is secured and backlash-induced oscillations are avoided. As the electronic loop is closed at all times and a corrective tendency therefore always present, the danger of loss of synchronism due to run-off of the transducer characteristics is avoided.

The invention also features a simplified scanning system, by means of which the slave oscillator, if initially out of synchronism, is made to sweep the frequency spectrum of interest until the proper relationship with respect to the master frequency is attained. An error voltage converter, which is used primarily to apply the error signal in its proper form to an alternating-current servomotor, is designed to yield a small output when no error signal is present. Instead of there being no tendency toward correction when the slave oscillator is out of synchronism with the master frequency, the servomotor turns, causing the frequency range of the slave oscillator to be swept until the proper frequency is reached and the normal servo control begins to take effect.

Other objects and features of the present invention will appear upon consideration of the following more detailed exposition. In the drawings.

Figure 1:
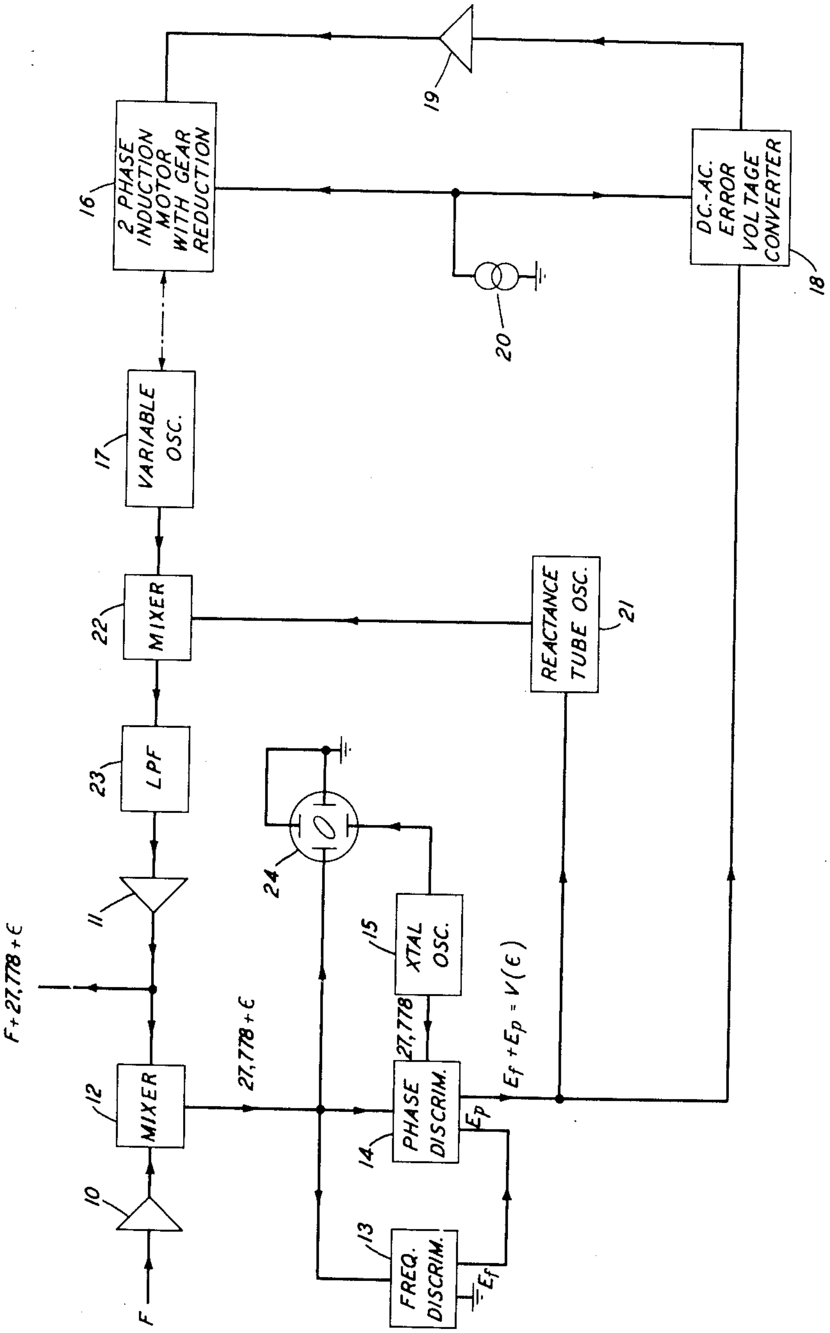
Fig. 1 is a block diagram of a slave oscillator embodying the features of the present invention.
Figure 2A:
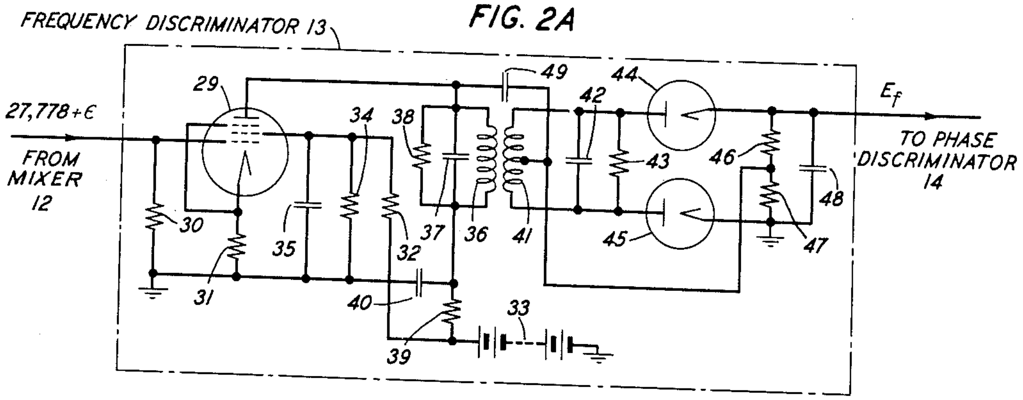
Fig. 2A illustrates the frequency discriminator used as part of the error signal transducing means of the slave oscillator of Fig. 1.
Figure 2B:
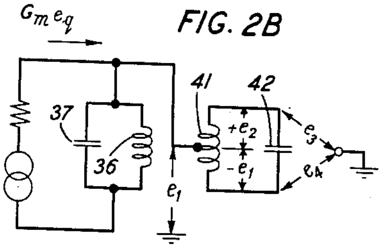
Fig. 2B shows an equivalent circuit of the frequency discriminator of Fig. 2A.
Figure 2C:
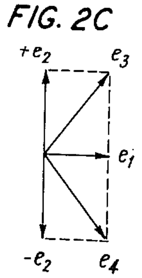
Figure 2D:
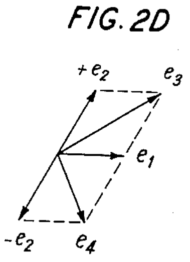
Figure 2E:
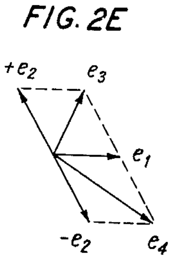
Figure 2F:
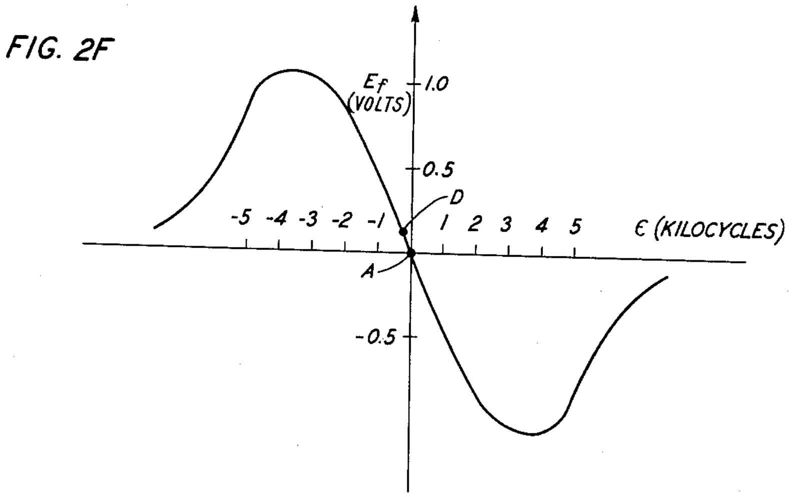
Figure 3A:
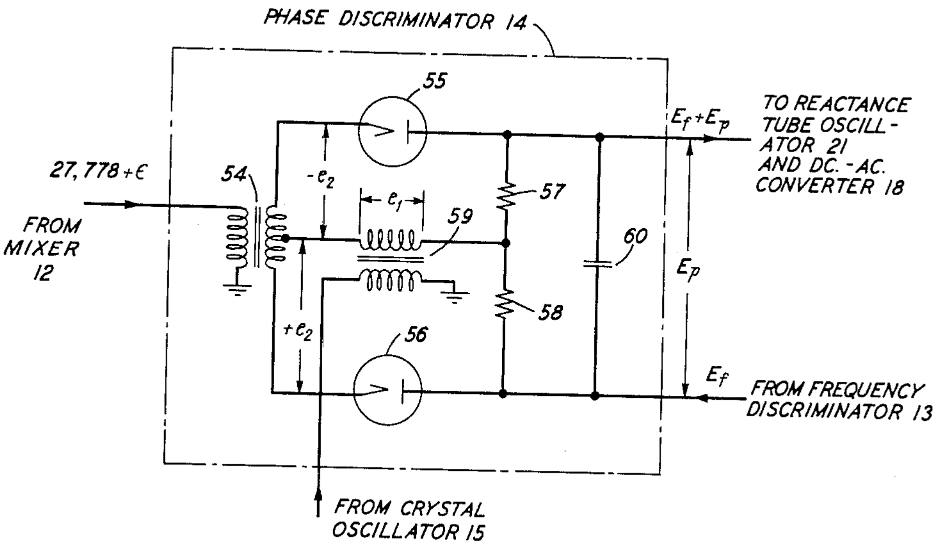
Figure 3B:
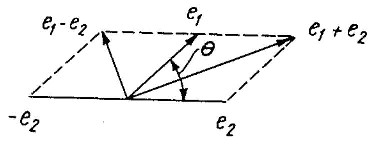
Figure 3C:
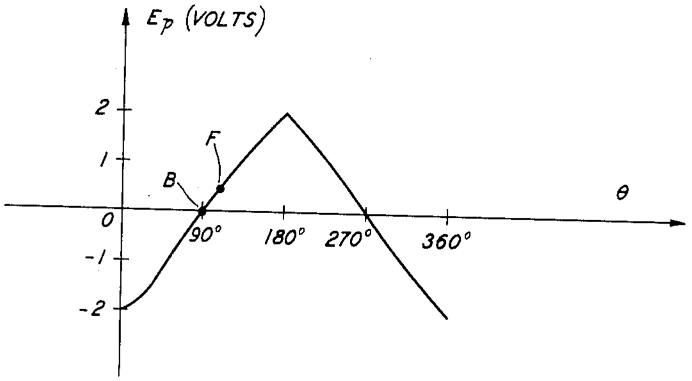
Figure 4A:
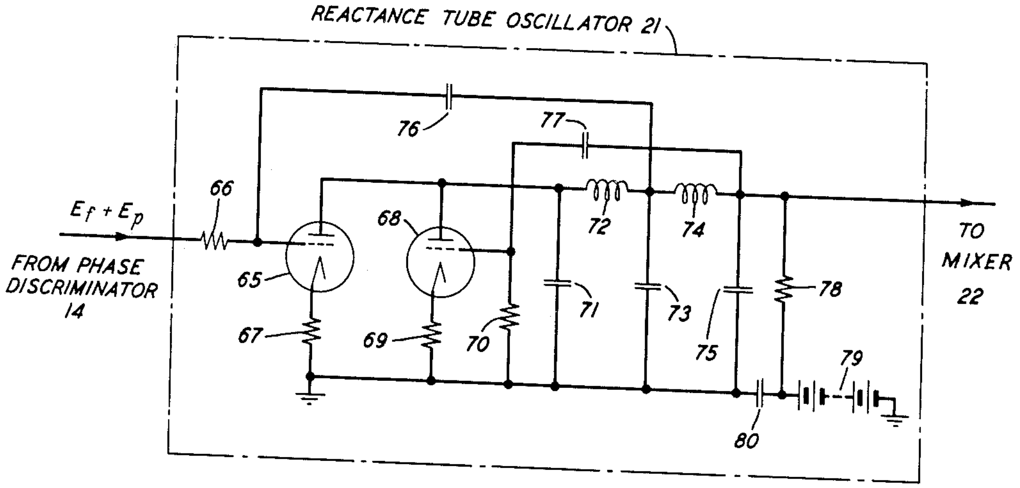
Figure 4B:
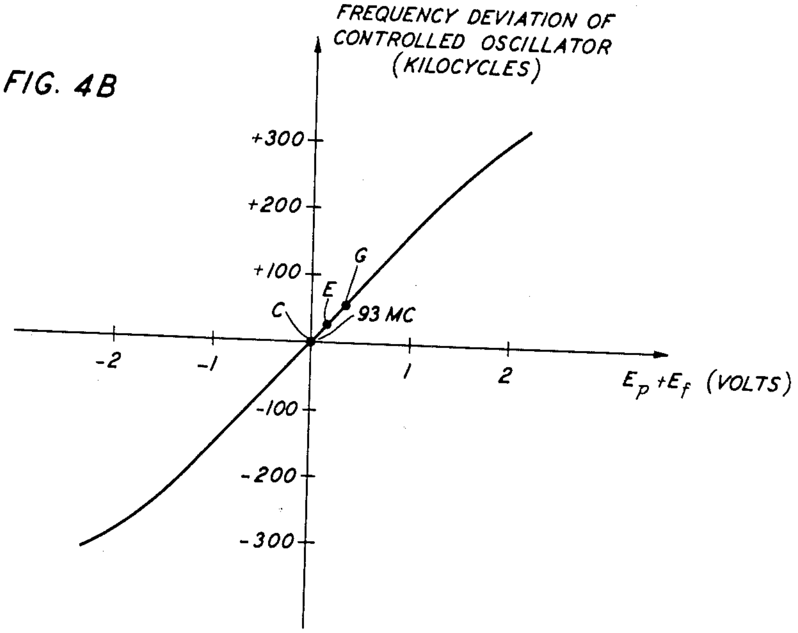
Figure 5:
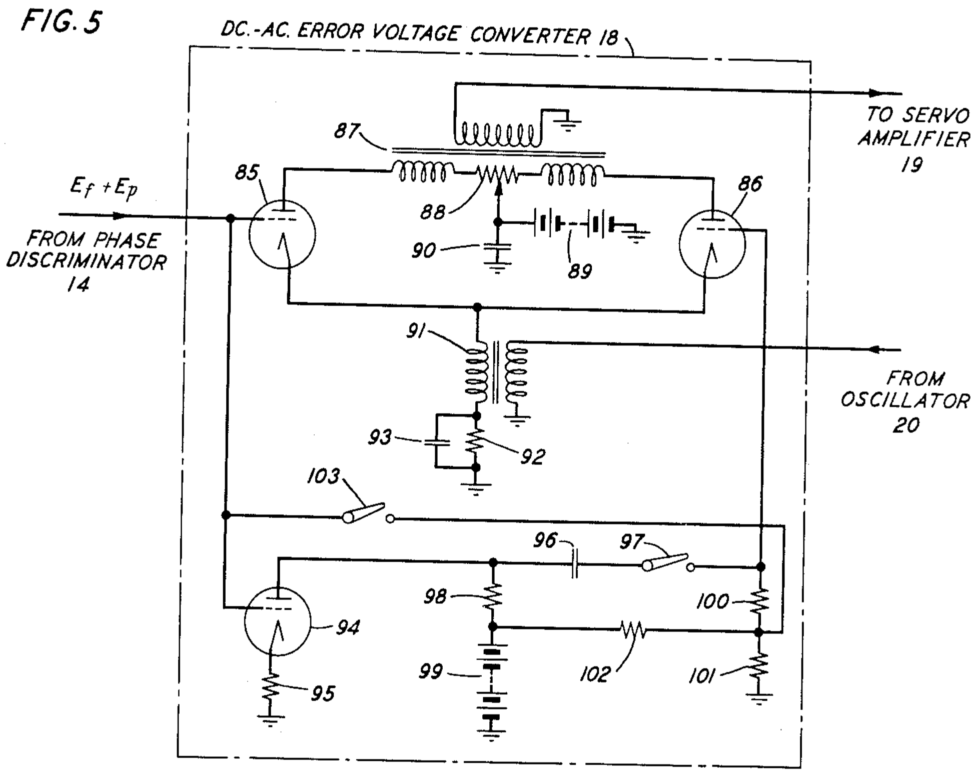
Figure 6A:
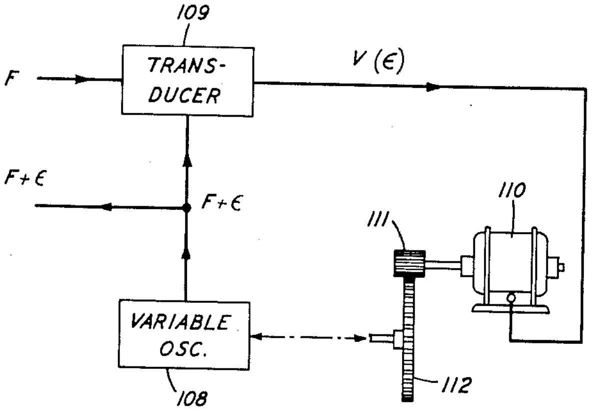

Figs. 2C, 2D, and 2E are vector diagrams representing the operation of the frequency discriminator shown in Fig. 2A;

Fig. 2F is the response curve of the frequency discriminator of Fig. 2A;

Fig. 3A depicts the phase discriminator used as the other principal part of the error signal transducing means of the slave oscillator of Fig. 1;

Fig. 3B is a vector diagram representing the operation of the phase discriminator of Fig. 3A;

Fig. 3C is the response curve of the phase discriminator of Fig. 3A;

Fig. 4A shows the reactance tube oscillator used in the slave oscillator shown in Fig. 1;

Fig. 4B is the frequency control characteristic of the reactance tube oscillator of Fig. 4A;

Fig. 5 illustrates the error voltage converter used in the mechanical servo loop of the slave oscillator of Fig. 1;

Fig. 6A shows an elementary mechanical automatic frequency control circuit; and

Figure 6B:
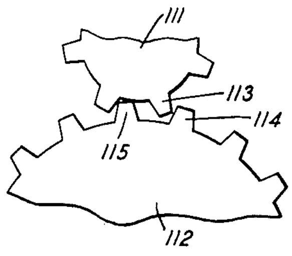

Fig. 6B illustrates the effect of backlash in the gear train of the simplified automatic frequency control system of Fig. 6A.

The various features of the invention may best be understood if a specific slave oscillator embodying them is first considered. The slave oscillator in Fig. 1 is a variable frequency heterodyne oscillator utilizing automatic control circuits to align its output frequency exactly 27,778 cycles above a master frequency lying anywhere in the range from 50 kilocycles to 20 megacycles. Input voltages of master and slave frequency are supplied through respective amplifiers 10 and 11 to a comparison modulator or mixer 12. A filter in the output circuit of modulator 12 rejects all but the difference frequency which is passed on to the frequency error sensing elements. Because of the automatic frequency control, this difference may be only 27,778 cycles but, as an aid in the explanation of the control circuit operation, a small frequency error $\epsilon$ is assumed to exist. With the master frequency denoted F, the slave frequency will be $F+27{,}778+\epsilon$, and $F+27{,}778+\epsilon$ will be presented to the error sensing elements. These include a frequency discriminator 13, centered at 27.78 kilocycles, and a phase discriminator 14, supplied with a second input of reference phase from a crystal oscillator 15 operated at exactly 27,778 cycles. Output $E_f$ from frequency discriminator 13 is added to the output $E_p$ from phase discriminator 14, forming a direct voltage function of the error, $E_f+E_p$, which is used by the automatic control circuit in regulating the frequency of the slave oscillator.

Two control loops are actuated by $E_f+E_p$. A mechanical servo loop includes a two-phase 60-cycle induction servo motor 16, a variable mechanically-tuned oscillator 17, and an error voltage converter 18. The shaft of servo motor 16 is coupled through an appropriate gear train to the tuning condenser of variable oscillator 17, the gear reduction being of the order of 500 to 1. The direct error voltage $E_f+E_p$ is supplied to converter 18, the 60-cycle output of which is supplied through an amplifier 19 to the control phase of servo motor 16. A suitable alternating-current source 20 supplies both the reference phase of servomotor 16 and the carrier input circuit of converter 18.

An electronic control loop includes a reactance tube oscillator 21, the frequency of which is controlled by the direct error voltage $E_f+E_p$. The respective outputs of variable oscillator 17 and reactance tube oscillator 21 are combined in a modulator or mixer 22, and their difference, selected by a low pass filter 23, is the useful output of the slave oscillator. The concerted automatic frequency correction by both loops is such that any deviation of the input to the error sensing elements from 27,778 cycles causes the frequency of the slave oscillator to change in the direction to eliminate the deviation.

A monitoring oscilloscope 24 is provided with the output of modulator 12 coupled to one pair of deflecting plates and the output of crystal oscillator 15 coupled to the other.

Details of frequency discriminator 13 are shown in Fig. 2A. The input lead from mixer 12 is connected to the control grid of the discriminator tube 29. A grid leak resistor 30 is coupled between the control grid of tube 29 and ground, while a cathode resistor 31 is connected between the cathode and ground. Discriminator tube 29 is shown as a pentode, and its suppressor grid is coupled directly to the cathode while the screen is connected through a dropping resistor 32 to the positive side of the plate supply source 33. The negative side of source 33 is grounded. A resistor 34 and a by-pass condenser 35 are connected in parallel between the screen of discriminator tube 29 and ground.

The plate of tube 29 is connected to one side of a tuned circuit comprising a coil 36, a condenser 37, and a resistor 38 connected in parallel. The other side of the tuned circuit is coupled to the positive side of plate supply source 33 through a dropping resistor 39. A by-pass condenser 40 is connected between the side of the tuned circuit away from the plate and ground.

The tuned circuit in the plate circuit of discriminator tube 29 is inductively coupled to a second tuned circuit. The second tuned circuit comprises a center-tapped coil 41, a condenser 42, and a resistor 43 connected in parallel with each other. The two sides of the second tuned circuit are connected to respective plates of a pair of diodes 44 and 45. The cathode of diode 45 is grounded, while that of diode 44 is coupled to the output lead going to phase discriminator 14. A pair of resistors 46 and 47, shunted by a condenser 48, are connected in series between the cathodes of diodes 44 and 45, and the junction between them is connected to the center-tap on coil 41. A coupling condenser 49 is connected between the plate of discriminator tube 29 and the center-tap on coil 41.

In frequency discriminator 13, the grid voltage $e_g$ appears across resistor 30 while a direct output voltage $E_f$ appears across condenser 48. The frequency of the voltage $e_g$ at the grid of discriminator tube 29 is the difference between the master and slave frequencies. Both tuned circuits are tuned approximately to 27,778 cycles, and the alternating component of voltage across the first is applied to the mid-tap of the coil 41 in the second by means of condenser 49.

The alternating-current operation of the frequency discriminator is demonstrated in Fig. 2B, where the pentode 29 is replaced by the equivalent current generator $G_m e_g$, $G_m$ being the transconductance of the tube. Other elements correspond to like numbered elements in Fig. 2A. When the frequency of the generator is 27,778 cycles, analysis shows that the mid-tap voltage $e_1$ is 90 degrees out of phase with the voltage $2e_2$ developed across the secondary circuit due to induction from the primary circuit. Voltages $e_3$ and $e_4$, resulting from the vector additions $(e_1+e_2)$ and $(e_1-e_2)$ respectively, are then equal, as shown in Fig. 2C. When the applied frequency differs from the circuit resonance, the phase between $e_1$ and $e_2$ deviates from 90 degrees, giving rise to differences between amplitudes of $e_3$ and $e_4$. The direction of the deviation depends upon whether the applied frequency is above or below the circuit resonance. As shown in Fig. 2D, when above resonance (a positive frequency error of the slave oscillator), $e_3$ is greater than $e_4$. As shown in Fig. 2E, when below resonance (a negative frequency error of the slave oscillator), $e_3$ is less than $e_4$.

In Fig. 2A the voltages corresponding to $e_3$ and $e_4$ are rectified by the diodes 44 and 45, which are connected so that the rectified currents flow in opposite directions through resistors 46 and 47. The output voltage $E_f$ of frequency discriminator 13, appearing across condenser 48, is proportional to this difference between these rectified currents and hence to the difference of amplitude between voltages $e_3$ and $e_4$ of Fig. 2B. When the frequency error is positive, $e_3$ is greater than $e_4$, so that the voltage across resistor 46 in Fig. 2A is greater than that across resistor 47 and a negative voltage is developed, making $E_f$ negative. A negative frequency error increases the amplitude of $e_4$ as compared with $e_3$, so the voltage across resistor 47 is greater than that across resistor 48, making $E_f$ positive.

The variation of $E_f$ with the deviation of the applied frequency from 27.78 kilocycles is shown in Fig. 2F, where $E_f$ is measured in volts and $\epsilon$ is measured in kilocycles. This is the response curve of frequency discriminator. For a given discriminator, the slope of the curve (and thus the discriminator sensitivity) is a function of the alternating plate voltage of the discriminator tube. In Fig. 2F, the curve is drawn for the case where the root mean square plate voltage of pentode 29 is 1.5 volts at 27.78 kilocycles, its design center value in the slave oscillator. The slope over the linear portion is .4 volt per kilocycle. $E_f$ returns asymptotically to zero for large frequency errors of either sign because of collapse of impedance of the tuned circuits when far from resonance.

In an automatic control circuit using only a frequency discriminator as an error detector, total elimination of the error is impossible because the presence of a certain amount of error is required for such a circuit to be operative. With stresses inevitably present attempting to produce error, control to the precision of one cycle would not be possible. Total reduction of the operation frequency error to zero is made possible in the control circuit of Fig. 1 by governing the slave frequency, not only from the frequency discriminator output, which is proportional to the frequency error, but also by a phase detector output proportional to the time integral of the frequency error.

Phase discriminator 14 is illustrated in detail in Fig. 3A. The input lead from mixer 12 is connected to one side of the primary winding of an input transformer 54. The other side of the primary is grounded. The ends of the secondary winding of transformer 54 are connected to the respective cathodes of a pair of diodes 55 and 56. A pair of resistors 57 and 58 are connected in series between the plates of diodes 55 and 56, and the secondary winding of a transformer 59 is coupled between the midpoint of the secondary winding of transformer 54 and the junction between resistors 57 and 58. Crystal oscillator 15 is connected across the primary winding of transformer 59. A condenser 60 is connected between the plates of diodes 55 and 56 and, while the plate of diode 56 is connected to frequency discriminator 13, the plate of diode 55 is coupled to reactance tube oscillator 21 and to converter 18.

To the phase discriminator which has been described, crystal oscillator 15 delivers a constant frequency of 27,778 cycles, which is the difference to be maintained between the master and slave frequencies. That frequency is supplied through transformer 59. The input at transformer 54 bears the difference between the slave and master frequencies, which is exactly 27,778 cycles if no error is present. Assuming the latter condition, both inputs are of identical frequency. The discriminator operation may then be studied as a function of the steady state phase difference $\theta$ between the inputs.

In Fig. 3A, the input at transformer 59 causes a voltage $e_1$ to be introduced across the secondary winding thereof, while the input at transformer 54 causes voltages $-e_2$ and $+e_2$ to appear between the mid-point of the secondary winding of transformer 54 and the cathodes of diodes 55 and 56, respectively. Diode 55 rectifies the voltage $(e_1-e_2)$ and diode 56 rectifies the voltage $(e_1+e_2)$. The rectified current due to $(e_1-e_2)$ produces a voltage across resistor 57 which is opposite to that produced by $(e_1+e_2)$ across resistor 58. The net difference appears as the output $E_p$ across condenser 60, and will be negative when the amplitude of $(e_1+e_2)$ is greater than that of $(e_1-e_2)$ and positive when it is less.

The vector addition and subtraction of the voltages $e_1$ and $e_2$ are shown in Fig. 3B. In that figure:

$$e_1=E \sin(\omega t+\theta)$$

and $$e_2=E \sin \omega t$$

where:

E represents the amplitudes of the respective waves,
$\omega$ represents the radian frequency,
$t$ represents time, and
$\theta$ represents the phase difference between $e_1$ and $e_2$.

The voltages $(e_1-e_2)$ and $(e_1+e_2)$ are rectified in the manner described and by the law of cosines:

$$[\text{Amplitude of } e_1+e_2]^2=2E^2(1+\cos {}^2\theta)=E_{(+)}$$

and $$[\text{Amplitude of } e_1-e_2]^2=2E^2(1-\cos {}^2\theta)=E_{(-)}$$

$E_p$, which is proportional to the amplitude difference between the two voltages rectified by diodes 55 and 56, is proportional to $$E_{(+)}-E_{(-)}$$

By trigonometric reduction, $E_p$ is thus proportional to $$\cos\frac{\theta}{2}-\sin\frac{\theta}{2}$$

As may be noted from Fig. 3B, whenever $\theta$ is an odd multiple of 90 degrees, the vector sum and difference are equal, making $E_p$ zero. Also, when $\theta$ equals zero, the sum is at its maximum value while the difference is at its minimum value, and the voltage $E_p$ will therefore have a negative minimum value with respect to $\theta$. In the same way, it may be seen that when $\theta$ equals 180 degreen, $E_p$ is at a positive maximum. The half angle function $$\left(\cos\frac{\theta}{2}-\sin\frac{\theta}{2}\right)$$

evolved on the assumption that the amplitudes of $e_1$ and $e_2$ are equal, is substantially a linear function of $\theta$, the deviation linearity being less than five percent over the ranges from 30 degrees to 150 degrees and from 210 degrees to 330 degrees. When the amplitudes of $e_1$ and $e_2$ are unequal, the effect is to narrow somewhat the range over which the discriminator output is a linear function of $\theta$. $E_p$ is plotted against $\theta$ in Fig. 3C. For convenience, it is assumed that the curve is perfectly triangular. In the example shown, the slope is 22 millivolts per degree.

Thus far, the analysis has been confined to steady state conditions. It is necessary now to generalize for the case of varying frequency input, since the frequency of $e_2$ in Fig. 3A will not be exactly 27,778 cycles when a frequency correcting transient is in progress. Before the control circuit completely eliminates the frequency error, the frequency of $e_2$ will describe some path in time in returning to 27,778 cycles. In order for the control circuit action to be predicted, the variation in the phase discriminator output voltage during this frequency transient must be determined.

Since the instantaneous phase of a wave with frequency $f(t)$ is $2\pi\int_0^t f(t)dt$, the phase of the fixed frequency input from the crystal oscillator 15 is then $2\pi\int_0^t 27{,}778\ dt$. The frequency of the $e_2$ input may be written as $27{,}778+\epsilon$, where $\epsilon$ is the instantaneous frequency error, i. e., the deviation of the frequency of $e_2$ from the proper 27,778 cycles. The phase $e_2$ is consequently $2\pi\int_0^t (27,778+\epsilon)dt$. The phase difference between inputs is $$2\pi\int_0^t(27,778+\epsilon)dt-2\pi\int_0^t 27,778dt$$

or $2\pi\int_0^t\epsilon dt$. The voltage from the discriminator is proportional to this phase difference, i. e., to the integral of the frequency error.

The output $E_f$ from frequency discriminator 13 on the other hand, is proportional to the frequency error itself. In the slave oscillator shown in Fig. 1, the frequency error is eliminated by the sum of the outputs $E_f+E_p$, and the control circuit belongs therefore to the class of negative feedback regulators called "proportional + integral," the combined voltage function of the error being $E_f+E_p=K_1\epsilon+K_2\int_0^t\epsilon dt$. The presence of the integral component in the control sequence is responsible for the reduction of the slave oscillator frequency error to zero, as will be brought out later.

This simple "integral" conception of the phase discriminator response to a varying frequency input is crude, but useful. Its validity is limited because it overlooks the specific mechanics of the detection process. Detection of the phase difference is based upon peak rectification of sum and difference voltages, as described. Actually then, even though the phase difference between the discriminator inputs is continuously varying with continuous frequency variation of either input, the corresponding voltage changes in the $E_p$ output cannot be smooth, but occur in pulses at the instants that the alternating voltages being rectified are passing through their peaks. Therefore, the maximum rate at which phase difference may be registered in the discriminator output is of the order of once per cycle at 27,778 cycles.

However, even this registry rate may not be realized. A second limitation to the speed of phase detection arises from the time constant of the filter comprising resistors 57 and 58 and condenser 60. The delay of the filter determines a maximum rate of envelope change which may be detected by the discriminator circuit, implying in turn, a maximum permissible rate of frequency error to which the discriminator responds as a perfect integrator. It is very difficult to make either a quantitative or a qualitative statement regarding the effect of this delay, because it arises in the highly non-linear process of peak detection. To make a rough description of the over-all control circuit possible, it is assumed that the rate of change of frequency error is sufficiently slow so that the discriminator functions as a perfect integrator.

With these reservations, the simple integral concept of the phase detector action is applied when describing the over-all functioning of the slave oscillator shown in Fig. 1.

A reactance tube is one of the two devices which, in accordance with the invention, are employed to vary the slave frequency under the control of the voltage output from the two discriminators 13 and 14. It operates in conjunction with a 93 megacycle local oscillator. Both the oscillator and the associated reactance tube comprise oscillator 21 of Fig. 1 and are shown in Fig. 4A.

In Fig. 4A, the output $E_f+E_p$ from frequency discriminator 13 and phase discriminator 14 is applied to the control grid of the reactance tube 65 through a resistor 66. A cathode resistor 67 is coupled between the cathode of reactance tube 65 and ground, while the plate is connected directly to the plate of the oscillator tube 68. The cathode of oscillator tube 68 is coupled to ground through a resistor 69, while the control grid is grounded through a resistor 70. The plate and the control grid of oscillator 68 are connected together through a phase shift network which comprises two similar $\pi$ structures in cascade. The network is made up of a condenser 71 connected between the plate and ground, a coil 72 with one side connected to the plate, a second condenser 73 connected between the other side of coil 72 and ground, a second coil 74 connected with one side to the other side of coil 72, and a third condenser 75 connected between the other side of coil 74 and ground. A pair of coupling condensers 76 and 77 are connected between the ungrounded side of condenser 73 and the control grid of reactance tube 65 and between the ungrounded side of condenser 75 and the control grid of oscillator tube 68, respectively. A terminating resistor 78 and a plate supply source 79 are connected in series between the ungrounded side of condenser 75 and ground, and a by-pass condenser 80 is connected between the positive side of source 79 and ground. The output of the reactance tube oscillator is supplied to mixer 22 over a lead connected to the junction between condenser 75 and resistor 78.

The capacities of condensers 71 and 75 are equal and are each one-half that of condenser 73. The inductances of coils 72 and 74 are equal. Resistance 78 terminates the network in its characteristic impedance, which is equal to the square root of the ratio of the inductance of one of the coils 72 and 74 to the capacity of one of condensers 71 and 75.

Reactance tube controlled oscillator 21 possesses high sensitivity and frequency stability, and its oscillation level is comparatively independent of frequency deviation. The frequency of oscillation, which is such that the phase difference between grid and plate terminals is 180 degrees, can be changed over very wide limits by applying reactive loads at either end of the network. This reactance is supplied by reactance tube 65, the plate of which is connected to that of the oscillator tube 68 and the control grid of which is capacitively coupled to the mid-point of the phase shift network. Since the voltage at the mid-point of the network is in phase quadrature with the plate of tubes 65 and 66, tube 65 appears as a reactance placed in parallel with the plate of oscillator tube 68.

Since the magnitude of the reactance developed is dependent upon the reactance tube transconductance, frequency of oscillation can be varied by changing the grid bias of the reactance tube. This bias is supplied by the algebraic sum, $E_f+E_p$, of the phase and frequency discriminator circuit outputs.

The curve of frequency change versus reactance tube grid bias for the reactance tube controlled oscillator used in the slave oscillator being described is shown in Fig. 4B. The slope in the vicinity of 93 megacycles is adjusted to 170 kilocycles per volt.

The electronic nature of reactance tube controlled oscillator 21 enables it to introduce very rapid corrections of the slave frequency. It has a potential range of about 3 megacycles. However, for reasons of stability, the range of its action is restricted to 700 kilocycles. The problem of tracking the master frequency over its full 20-megacycle frequency band is met by the use of a second means of slave frequency control, which covers the full range of the master frequency.

Wide band control of the slave frequency is obtained by servomotor tuning variable local oscillator 17 over the range from 73 to 93 megacycles under the control of the voltage outputs of phase and frequency discriminators 13 and 14. A complication arises because these voltages are direct, while the servomotor is a two-phase 60-cycle induction motor. In spite of this apparent difficulty, the use of an alternating-current rather than a direct-current servo is preferred because it eliminates the problems of brush friction and wear associated with direct-current motors and the drift problem associated with direct-current amplification.

Motivation of an alternating-current servo from a direct error voltage requires a device to convert the error voltage to alternating current. The magnitude and polarity attributes of the direct current must be superimposed on the alternating-current output of the converter.

Error voltage converter 18 of the slave oscillator shown in Fig. 1 is illustrated in detail in Fig. 5. There, the direct error voltage $E_f+E_p$ is applied directly to the control grid of a triode tube 85. The cathode of tube 85 is coupled directly to the cathode of a similar tube 86. The two tubes 85 and 86 may, for example, be the two halves of a single triode type tube. The divided primary winding of a transformer 87 is connected between the plates of tubes 85 and 86, and a rheostat 88 is connected between the two halves of the winding. The secondary winding of transformer 87 is connected to servo amplifier 19 of Fig. 1. A plate current supply source 89, by-passed by a condenser 90, is coupled between the contact arm of rheostat 88 and ground.

60-cycle carrier current is supplied to the common cathode circuit of the two converter tubes 85 and 86. One side of the secondary winding of a transformer 91 is connected to both cathodes and a resistor 92, shunted by a by-pass condenser 93, is connected between the other side of the secondary winding and ground. The primary winding of transformer 91 is connected to 60-cycle oscillator 20 of Fig. 1.

The control grid of tube 85 is also connected directly to the control grid of a triode tube 94. The cathode of tube 94 is grounded through a resistor 95, and its plate is connected to the grid of tube 86 through a condenser 96 and a switch 97. A resistor 98 and a plate supply source 99 are connected in series between the plate of tube 94 and ground, while a pair of resistors 100 and 101 are connected in series between the grid of tube 86 and ground. Another resistor 102 is connected from the junction between resistor 98 and supply source 99 to that between resistors 100 and 101. A balancing switch 103 is connected between the grid of tube 85 and the junction between resistors 100, 101, and 102.

For purposes of explanation, switches 97 and 103 are assumed to be opened temporarily. Under such conditions, the converter formed by the tubes 85 and 86 and the associated elements operates as follows. The 60-cycle currents flowing in each half of plate circuit transformer 87 are in opposite directions, so that they set up opposing fluxes in the transformer core. If these currents are equal in magnitude, there is no net alternating-current magnetization of the core and the secondary output voltage is zero. When the alternating current in the left half is greater than the right half, output of a given phase (zero, for example) with respect to the alternating carrier voltage injected in the cathode is obtained. When the current in the right half is greater, the net alternating-current flux in the core is of the opposite sense, so that the output voltage is shifted 180 degrees in phase relative to the previous condition. In both cases, the magnitude of the output depends on the degree of current unbalance. The distribution of current may easily be varied by changing the relative amplification between the two tubes 85 and 86, which can be done by varying the voltage $E_f+E_p$ when it is applied as bias to grid of tube 85.

In an initial adjustment, the grids of tubes 85 and 86 are connected directly together by closing balancing switch 103. As no grid current is drawn, resistor 100 does not limit the effectiveness of the short-circuit. The differential resistance between the two halves of the converter is then adjusted by the rheostat 88 until the plate currents of tubes 85 and 86 are equal and the transformer secondary voltage is zero. This adjustment compensates for the residual amplification factor and plate resistance unbalance between the two halves of the converter.

In accordance with a feature of the invention, the balance voltage at the grids of tubes 85 and 86 across resistor 101 is .4 volt rather than zero, as will be brought out later. Because resistance 101 is very small compared to the output impedances of discriminators 13 and 14, the balancing voltage across it is able to override the $E_f+E_p$ voltage at the grid of tube 85. When balancing switch 103 is opened, the servo operates to hold the same direct voltage at the grid of tube 85 that has been present during the balancing procedure.

Operation with the converter in balance at .4 volt does not mean that a frequency error is normally present in the system. It means only that, instead of being centrally located on the phase discriminator curve of Fig. 3C, the normal point of operation is at $\theta=108$ degrees, where the voltage output $E_p$ is .4 volt.

The function of tube 94 is to introduce what is called "rate circuit" or "derivative" stabilization in the servo loop. Stabilization of this type is generally necessary for the prevention of self-oscillation, or hunting, where the servo gain has been made large to achieve rapid response. The cause of the oscillation is storage of energy in the moment of inertia of the control motor. The servo designer may overcome this by arranging the servo loop so that the control current supplied to the servo motor is proportional, not only to the error of the mechanism (in this case, the voltage $E_f+E_p$) but also to selected time functions of the error. A commonly used technique is to energize the control phase of the motor from data which is proportional to error plus its time derivative. The time derivative factor increases the damping in the loop, permitting larger values of the proportional factor of loop gain to be used before the onset of excessive overshoot, or sustained oscillation.

It is desirable, then, to modulate the output voltage of the converter from voltage of the form $$\frac{d(E_f+E_p)}{dt}$$

as well as $E_f+E_p$. The circuit for doing this is associated with tube 94. Switch 97, originally opened to simplify the explanation of the stage comprising tubes 85 and 86, is now closed. By this action, the plate of tube 94 is coupled to the grid of triode 86 through blocking condenser 96. Tube 94 amplifies the voltage $E_f+E_p$, the amplified voltage appearing across resistor 98. Between the plate of tube 94 and ground, blocking condenser 96 and resistor 100 are proportioned to make the combination a differentiating circuit. Resistor 101 is large in comparison with resistor 100 and therefore need not be considered in an alternating-current analysis. Because of the differentiation introduced by condenser 96 and resistor 100, the voltage across resistor 100 is proportional to the time derivative of the voltage across resistor 98. Resistor 98 is made very small compared with resistor 100 so that the impedance at the plate of tube 94 is substantially resistive and tube 94 introduces a phase shift of 180 degrees. The derivative voltage across resistor 100 is, therefore, 180 degrees out of phase with the time derivative of $(E_f+E_p)$. Such a phase of derivative component is exactly right to apply to the grid of tube 86 of the converter to achieve the same modification of the envelope and phase of transformer 87 secondary voltage that would result from placing the derivative of $E_f+E_p$ itself on the grid of tube 85.

By using both grids of the converter as signal grids, proportional and derivative components may be separated, and injected individually into the servo loop. The error converter then assumes a second function; it acts both as a converter and as a mixer to combine the effects of the two components $E_f$ and $E_p$ and $$\frac{d(E_f+E_p)}{dt}$$

on the converter output.

The converter output voltage, as modified by the proportional and derivative error components, is amplified by amplifier 19 in Fig. 1. Amplifier 19 may, by way of example, comprise two stages, a voltage and power stage. The power output stage energizes the regulating, or control phase of the servomotor 16. The reference phase is energized from the same carrier source 20 as that used to activate the error voltage converter. A specific amount of phase shift may be built into the amplifier to set the currents in the control and reference windings of the motor in quadrature, insuring maximum torque output from motor 16. The rotor of the tuning condenser in variable local oscillator 17 is attached to the motor shaft through 500 to 1 reduction gearing.

In effect, there is negative feedback between the frequency of local oscillator 17 and the error signal $E_f+E_p$. Should a frequency error arise in the slave oscillator, $E_f+E_p$ will no longer be .4 volt, so that the shaft of servomotor 16 will turn. As it turns, the frequency of local oscillator 17 changes. This, in turn, is reflected as a change of slave oscillator frequency in the direction to reduce the frequency error and return $E_f+E_p$ to .4 volt. Positive and negative frequency errors shift $E_p+E_f$ in opposite directions from .4 volt, causing opposite directions of variable local oscillator frequency change, as is required to eliminate the error in both cases.

Error voltage converter 18 is the subject matter of application Serial No. 220,570 filed April 12, 1951, jointly by N. D. Smith and the present inventor.

The operation of the electronic control loop of the slave oscillator shown in Fig. 1 may best be explained by first assuming that the mechanical loop is not operating. In practice, this may be arranged by disconnecting the reference phase of the servomotor 16 from its input and disabling the servo.

An effective method of explaining the electronic loop operation is to assume that up to some specific instant the desired frequency difference between master and slave sources exists without error, and then to show how the circuit restores this condition if an error is suddenly introduced. The simplest way of introducing the error is to make a step-change of master frequency. Prior to the change, however, the following assumptions are made regarding the initial condition of the circuit:

(1) The steady state has persisted sufficiently long so that all transients due to previous disturbances have decayed to zero.

(2) Before the change of master frequency, the latter is at $F_0$, with the slave oscillator at a corresponding $F_0+27,778$. Their difference is thus exactly the desired value, so that there is no frequency error.

(3) Not only is the frequency error zero, but the "operating strain" of the control circuit is reduced to zero by adjustment of the tuning condenser of variable local oscillator 17. This means that, initially, operation is at the central points of all characteristic curves. On the frequency discriminator curve of Fig. 2F, the initial location is at A, the origin, because of the absence of frequency error. With the absence of strain in the loop, initial operation is also at the origins of the phase discriminator and reactance tube curves of Figs. 3C and 4B at points B and C, respectively. Operation along the positive slope of the phase discriminator curve is essential to obtain a slave frequency output that is the upper sideband ($F_0+27,778$) relative to the master frequency. If control established itself along the negative slope, the slave frequency would be at $F_0-27,778$. The joint use of frequency and phase discriminators prevents this from happening. The property of the circuit preventing lower sideband operation is explained later.

(4) That no delays are present in the control circuit except a delay which will presently be shown to be inherent in the phase discriminator, arising from the fact that its output is proportional to the integral of the frequency error.

Now F is suddenly increased from the value $F_0$ to a new value $F_0+1$ kc., thereby lowering the output of modulator 12 from 27,778 to 26,778 cycles. This produces a frequency error of 1 kilocycle at the input to the frequency discriminator 13. As yet, no phase change has occurred between inputs $e_1$ and $e_2$ to phase discriminator 14, because the frequency change is assumed to occur in infinitesimal time. At this instant, therefore, phase discriminator 14 exerts no corrective force and may be considered momentarily inoperative, while frequency discriminator 13 is wholly operative and capable of exerting its full correction. This it does, raising the frequency of reactance tube controlled oscillator 21 and reducing the slave frequency error by an amount dependent upon the loop gain during this frequency correction. The gain which is effective at this instant, when only frequency discriminator 13 is controlling, is the product of the slopes of the reactance tube and frequency discriminator curves of Figs. 4B and 2F, respectively. This product is 70 for the slave oscillator being described. Negative feedback regulator theory indicates that, with this amount of loop gain, the 1 kilocycle error initially present is reduced to $$\frac{1\text{ kc.}}{70}$$

or approximately 15 cycles. In theory, all this is accomplished before any corrective voltage appears at the phase discriminator output. At the instant immediately following the correction, the positions on the control curves will have been shifted to point D on the frequency discriminator curve of Fig. 2F and point E on the reactance tube curve of Fig. 4B.

The combined system now responds jointly to cancel the remaining 15-cycle error. As the frequency of $e_1$ is greater than $e_2$, its phase begins to advance over that of $e_2$, causing $E_p$ to grow positively in accordance with the phase discriminator curve of Fig. 3C. This increasing voltage is applied to the reactance tube grid, further raising the frequency of oscillator 21 and diminishing the error. As the frequency error grows smaller, the frequency of $e_2$ approaches $e_1$, and therefore the phase of $e_1$, though still advancing ahead of $e_2$, will do so at a decreasing rate. This slows down the rate of upward progression along the phase discriminator curve of Fig. 3C. Finally, when the error is zero and the slave frequency is raised by the 1 kilocycle increment given to the master frequency, the phase difference between $e_1$ and $e_2$ is static, but no longer 90 degrees, and $E_p$ has a new value somewhere on the positive slope of the phase discriminator curve of Fig. 3C. It will remain at this new value as long as no further stresses are imposed on the automatic frequency control circuit. The final operating points with the correction completed are at some point F on the phase discriminator curve of Fig. 3C, G in the reactance tube curve of Fig. 4B and the origin of the frequency discriminator curve of Fig. 2F. An opposite action to the above would have occurred had the master frequency been reduced by 1 kilocycle.

The purpose of monitoring oscilloscope 24 is to provide information regarding the action of the control circuit. Lissajous figure comparison is made between the crystal oscillator frequency and the difference prevailing between the slave and master frequencies. As these are equal except during a frequency correcting transient, an ellipse is normally observed on the cathode-ray tube screen.

To simplify description in the above illustration of the circuit response to an increment of master frequency, it was assumed that $e_1$ and $e_2$ were initially set in quadrature by a reactance adjustment in variable local oscillator 17. Consequently, the phase discriminator voltage $E_p$ was initially zero. In the actual circuit, the equilibrium or static operating position on the phase discriminator curve is at 108 degrees, because the electro-mechanical servo is balanced at .4 volt, rather than zero. The explanation just given still applies, however. The stress introduced in the loop by the slave frequency correction will cause a shift of operating point away from 108 degrees, where $E_p$=.4 volt, instead of away from 90 degrees. The amount of the shift remains unchanged because of the linearity of the phase discriminator and reactance tube characteristics.

It is possible to get some additional insight into the mechanism of the phase sensitive frequency control by considering the error elimination process from a slightly different viewpoint. The above description, which is more graphic than analytic, dealt directly in phase terms. In an alternative view, the action may be considered in frequency terms only.

From the previous discussion of phase discriminator 14, it was deduced that $E_p = K_2 \int_0^t \epsilon dt$. Consequently, when the 1 kilocycle error is first introduced in the circuit at $t=0$, $E_p$ is necessarily zero, since the value of the integral is zero. As time advances, the integral grows larger, but simultaneously the application of $E_p$ to the reactance tube causes the integral to grow smaller. When $\epsilon$ is zero, occurring theoretically after the lapse of infinite time, $E_p$ assumes a stationary value. In a practical circuit, the rate of convergence of the integral to a fixed value is very rapid, and effectively the error $\epsilon$ is eliminated in several milliseconds.

A physical interpretation of the integral is that it represents the area under the $\epsilon$ versus $t$ curve. The exponential curve is a function having a finite area between itself and the abscissa axis, over infinite ranges of the abscissa. For example, $$\int_0^\infty e^{-x} dx$$

has the value unity. A very simple first order analysis of the action of the circuit in eliminating the 1 kilocycle error reveals that the variation of $\epsilon$ is actually exponential with time and has a very large decrement. This is why a convergent result is obtainable so rapidly.

Though the time variation of the phase difference between the phase discriminator inputs during the frequency correction is not immediately obvious, the final phase shift when the correction is completed is very easily computed. The reactance tube will have injected sufficient reactance into the oscillator circuit to raise the slave frequency 1 kilocycle. With a reactance tube sensitivity of 170 kilocycles per volt, this requires a permanent voltage change of about 6 millivolts at the output of the phase discriminator 14. The slope of the phase discriminator curve is 22 millivolts per degree. Therefore, the displacement required on the discriminator curve to eliminate the error is about .4 degree.

The use in the slave oscillator circuit of phase and frequency sensitive control possesses several advantages not found in systems having phase control only, or frequency sensitive control only. In a control circuit that uses only a phase discriminator and an associated reactance tube, the controlled oscillator may synchronize at either of the sideband frequencies, $F+27,778$ or $F-27,778$. This may be demonstrated from Fig. 1 if it is assumed that frequency discriminator 13 has been made inoperative by short-circuiting $E_f$. Then, let it be further assumed that the slave oscillator is still at $F+27,778$ and operation on the phase discriminator curve of Fig. 3C is along the positive slope, centered at 90 degrees. If the master frequency F is now slightly increased, this is reflected as a decrease in the frequency of $e_2$ in relation to $e_1$, so that the phase of $e_1$ advances over that of $e_2$, and increasing corrective voltage is developed at the phase discriminator output. This voltage raises the frequency of the slave oscillator by means of the reactance tube, eliminating the error.

However, if the slave oscillator happens to shift its frequency to $F-27,778$, this would imply operation along the negative slope of the phase discriminator curve of Fig. 3C, centered at 270 degrees. In this condition, if the F is increased, this is reflected as an increase in the frequency of $e_2$ over $e_1$, so that the phase of $e_1$ slips behind that of $e_2$. This causes the point of operation on the negative slope of the phase discriminator characteristic to move upward, thus increasing the frequency of the slave oscillator by the reactance tube action, and eliminating the error. Therefore, there are points of stable operation at both $F+27,778$ and $F-27,778$, only one of which is desired.

In contrast, the frequency sensitive control is not subject to this ambiguity. With the short circuit across frequency discriminator 13 removed, if the slave oscillator were to attempt operation at the lower sideband $F-27,778$, an increase $\Delta$ of master frequency would then appear as a change in the input to mixer 12 of from F to $F+\Delta$. The corresponding mixer output would be $(F+\Delta)-(F-27,778)$, or $\Delta+27,778$. The frequency error is positive, causing a negative voltage output from the frequency discriminator. When applied to the reactance tube, this voltage lowers the slave oscillator frequency, increasing rather than decreasing the error. An unstable situation is thus created, making it impossible for the circuit to remain locked in at the lower sideband. On the other hand, in operation at the upper sideband, $F+27,778$, the frequency discriminator control is perfectly stable. An increase to the master frequency causes a negative frequency error, which results in positive voltage output from the frequency discriminator. This positive voltage raises the slave frequency and the error is reduced. The combination of both phase and frequency discriminator control thus permits slave oscillator operation at only $F+27,778$, where both frequency and phase discriminator circuits are cooperating in the reduction of error.

The situation may be summarized as follows: The frequency sensitive control is "polarized" with respect to sideband, but incapable of "zero frequency error" control. The phase sensitive control is capable of totally eliminating error, but will operate at either of two sidebands. The combination of phase and frequency sensitive control in the slave oscillator uses phase discriminator 14 to insure zero error control of the slave frequency, and the polarizing property of frequency discriminator 13 to insure operation at only the upper sideband.

Furthermore, the joint phase and frequency sensitive circuit possesses a far higher degree of stability than is obtainable with only phase discriminator control. Tendencies for loop oscillation to occur are damped out by the frequency sensitive control, allowing increased reactance tube sensitivity to be used. Consequently, variation of master frequency may be much greater than in only a phase sensitive circuit before the slave oscillator pulls out of synchronism.

In the previous explanation of the control circuit reaction to the sudden introduction of a 1 kilocycle error, it was found that in eliminating the error, a stress arose in the circuit. The point of operation on the phase discriminator curve moved upward by .4 degree. If now, additional stress were placed on the control circuit by further increasing the master frequency F, the point of operation would move up still further. When the operating point is finally at 180 degrees, the end of control range is reached, and no further capacity remains for error elimination. At this point the discriminator output is +2 volts, and since the curve extends in the negative direction to −2 volts, the maximum change of master frequency permissible with only the electronic loop operating is 700 kilocycles. The imposition of a further strain would cause the slave oscillator to fall out of synchronism.

However, as has been indicated, the range of master frequency is 20 megacycles, so that means of obtaining additional slave frequency range is required. This is provided in the circuit of Fig. 1 by servomotor tuning the variable local oscillator 17 from 73 through 93 megacycles. The same direct voltage function of the error, $E_f+E_p$, actuating the electronic loop, also actuates the mechanical servo loop.

For convenience, the action of the motor loop is considered independently of that of the electronic loop. As before, an initial state of zero frequency error is assumed. Because the servo is in balance when $E_f+E_p=.4$ volt, the initial location on the phase discriminator curve of Fig. 3C is at 108 degrees. An error is now introduced by suddenly increasing the master frequency. The resultant increase of $E_f+E_p$ unbalances error voltage convertor 18.

The shaft of servomotor 16 turns, and with it, but through reduction gearing, the rotor of the tuning condenser in the variable local oscillator 17. The slave frequency change caused by the motor rotation is in the direction to reduce the frequency error. Progressive reduction of $E_f+E_p$ takes place until this voltage is again at the value for which the servo is balanced and motor torque is zero, .4 volt. If the master frequency had been suddenly decreased rather than increased, a frequency error of opposite sign would be set up, $E_f+E_p$ would be less than .4 volt during the time interval required to execute the correction, and the motor rotation and sense of frequency change would be in the opposite direction. When the transient is over, $E_f+E_p$ would be restored to .4 volt, as before.

It is evident that when the frequency error has been eliminated the mechanical loop is again unstrained, because the output voltage from discriminators 13 and 14 is always returned to +.4 volt. In other words, the capacity to remove error is not diminished by previous frequency corrections. The range of the mechanical loop is limited only by the frequency coverage of the variable local oscillator 17. As this amply covers 20 megacycles, the master frequency may be varied by this amount without loss of the automatic slave frequency control.

As has been pointed out, a principal feature of the present invention is the presence, in an automatic frequency control system of the type shown in Fig. 1, of an electronic control circuit supplementing the mechanical servo loop. Instabilities which may result from backlash or hysteresis in the mechanical servo path are of two principal kinds, backlash oscillation and complete loss of closed loop automatic control. The electronic control loop is closed continuously serving thereby to overcome these instabilities.

In the design of a slave oscillator such as that shown in Fig. 1, there are two requirements which, in a sense, tend to be incompatible. In the first place, it is required that the slave frequency be variable over wide limits, eight octaves (from 50 kilocycles to 20 megacycles) in the example described. In the second place, the slave frequency must track the master frequency at a fixed interval (27,778 cycles in the example described) to a precision far in excess of one cycle. The first requirement necessitates a tremendously wide slave frequency coverage, while the second requires a slave frequency accuracy measurable in parts per hundred million.

Mechanical means of varying the slave frequency is found to be the most practical way of obtaining the broad frequency coverage. However, if it were attempted to achieve the grade of accuracy required by mechanical tuning alone, an impracticably severe requirement would be imposed on the motor mechanism design. A specific angular position of the rotor of servomotor 16 would be required to determine a specific slave frequency to a precision in excess of one part per million. The accuracy of this correspondence between rotor shaft angle and slave frequency would be required, furthermore, to be independent of whether the rotor, in changing from one setting to another, moves clockwise or counterclockwise. With the 500 to 1 gear reduction employed in the slave oscillator shown in Fig. 1, the extreme difficulty of meeting such a requirement is apparent. The remnant backlash of the gear train permits a slave frequency setting from the motor shaft to an accuracy of only several kilocycles at best. An indeterminacy greatly exceeding one part per million would still be present even if the most costly spring loaded reduction unit were employed. A certain amount of backlash must be present even in the tightest gear systems both to prevent seizing and to avoid inordinately great friction.

In order to illustrate the difficulties introduced by backlash in the mechanical servo loop, the problem may best be considered independently of the slave oscillator shown in Fig. 1. In a general case, where a broad band frequency coverage requirement is present, the slave frequency might be varied according to the setting of a servomotor controlled tuning condenser, which is under the control of some function of the prevailing frequency error between a master and the slave source. For reasons of mechanical stability, smoothness of operation, improved power output at higher motor speeds, and precision in setting the condenser shaft, a comparatively large gear reduction is necessary between the motor and condenser shafts. Introduction of the gear train brings with it all of the stability difficulties encountered when a servo loop possesses a hysteresis characteristic.

Fig. 6A illustrates a simplified control system of the type contemplated. The system is an electromechanical frequency control system whose purpose is to control the frequency of variable oscillator 108 so that it equals F, the frequency of the master generator. The prevailing difference or error $\epsilon$ between the "master" frequency and the "slave" frequency of variable oscillator 108 is converted to a corresponding voltage function $V(\epsilon)$, in transducer 109. The specific functional relation depends upon the kind of transducer employed. The frequency discriminator 13 and the phase discriminator 14 of Figs. 2A and 3A, respectively, are examples of transducers which may be used either separately or in combination. If the transducer 109 were a frequency discriminator centered at F, for example, the presence of a "master" frequency would be only implicit, and the output of oscillator 108 would be connected as input to the transducer directly. If the transducer were a phase discriminator the connection would be as shown in Fig. 6A. The voltage error $V(\epsilon)$ attempts to effect its own elimination by causing a tuning condenser shaft in variable slave oscillator 108 to turn in the appropriate direction to reduce the frequency error $\epsilon$. The apparatus shown for accomplishing this includes an electric motor 110 and the spur gear combination of gear 111 on the motor shaft and gear 112 on the condenser shaft. While in practice large gear reductions are obtained in several steps, the example will serve for purposes of illustration. A small amount of backlash exists between gears 111 and 112.

The troubles which may be experienced with the control circuit shown in Fig. 6A depend, to a considerable degree, upon the transducer function and upon the loop gain of the servo. Theoretical treatment is made difficult by the non-linear properties of backlash. However, an approximate physical picture of the cause of instability is possible for some simple cases. In connection with the present invention, principal interest is in two cases; that of a linear transducer function and that of a cumulative-with-time transducer function.

In a linear transducer, which may, for example, be a simple frequency discriminator, the transducer voltage $V(\epsilon)$ is directly proportional to $\epsilon$. This is a linear transformation of frequency error to voltage error and would be the situation presented in Fig. 6A if transducer 109 were a frequency discriminator centered at the initial master frequency.

To aid in the consideration of backlash Fig. 6B has been provided. With the initial gear configuration that shown in Fig. 6B, an error of frequency $\epsilon_0$ is suddenly introduced. The sign of $\epsilon_0$ is such that a clockwise rotation of gear 111 is required to reduce it. The error information acts through servomotor 110 to start the required rotation. Tooth 113 moves clear of tooth 114 and begins its journey towards tooth 115. As no frequency correction is possible until gear 111 is in contact with gear 112, a time lapse occurs between the instant the circuit first detected the frequency error and the beginning of the correction process. The delay is the time taken for gear 111 to traverse the full backlash angle between the gears. In other words, a time lag exists between the first appearance of the frequency error and the beginning of the sequence of events which should lead to the reduction of the error. In this time interval when gears 111 and 112 are not in contact, the control loop is open. It remains in this broken state until gear 111 again contacts 112, i. e., until tooth 113 strikes 115.

As gear 111 moves from its initial resting position it picks up speed in responding to the exciting voltage $V_0=K\epsilon_0$ caused by the initial error. It does not acquire its final velocity instantaneously because the inertia of the rotating members permits only a smooth velocity increase. By the time gear 111 has traversed the backlash angle, and tooth 113 is in position to strike tooth 115, the system has acquired considerable kinetic energy. To absorb this energy the servo causes gear 111 to drive gear 112 beyond the position of zero frequency error. The overshoot of gear 112 is just sufficient to set up a potential energy stress in the servo equal to the kinetic energy at the instant of impact by the gears 111 and 112. This overshoot produces a frequency error of opposite sign to that initially introduced. In an attempt to eliminate it, gear 111 is driven counterclockwise, with tooth 113 moving back to strike tooth 114. As before, the kinetic energy in the instant of impact is absorbed by overshoot and another cycle of oscillation is initiated. When the kinetic energy is sufficiently great and gear and bearing friction sufficiently small, the damping factor is so small that a state of steady oscillation persists.

The cause of the oscillation is thus seen to be the storage of energy in the moving members, and is made possible by the fact that the mechanical servo loop is open during transits of the backlash angle. In accordance with a feature of the present invention, a supplementary electronic control loop is placed around the mechanical servo loop to produce a stabilizing effect. This electric loop is free of backlash or hysteresis and is operative and exerting its correction at all times, including the intervals when the mechanical loop is open during backlash traverses.

The above example, in which a frequency discriminator was used as transducer 109 is simple in the sense that it produced a readily understandable oscillation difficulty. It is not, however, representative of the mechanical servo control loop in the slave oscillator shown in Fig. 1. The slave oscillator described in connection with Fig. 1 uses an integrating as well as a proportional transducer, i. e., a transducer which develops a voltage output containing terms proportional both to the frequency error and to the time integral of the frequency error. It is as if in Fig. 6A $$V(\epsilon)=K_1\epsilon+K_2\int_0^t\epsilon dt$$

With this kind of transducer function, the deleterious effects of backlash are not limited merely to the possibility of oscillation. As $K_2\int_0^t\epsilon dt$ is a cumulative function of time, it actually increases while the servo drive is taking up backlash in the gear mechanism.

It might appear that the only consequence of this cumulative time function would be the generation of a more severe backlash oscillation than in the case of linear transducer. This would be true if the phase discriminator characteristic, which is responsible for the integral component of the transducer output, $K_2\int_0^t\epsilon dt$, were indefinitely long. Such is not the case, however. The usable range of the phase discriminator characteristic is from 0 to 180 degrees and it is entirely possible that, in the time required for the servo to take up the gear blacklash, $\int_0^t\epsilon dt$ may increase to a value outside these bounds. In this event the slave oscillator falls out of synchronism and automatic control is lost.

In practice, the slightest initial stress is sufficient to result in run-off of such a transducer characteristic. This may be illustrated in connection with the slave oscillator shown in Fig. 1. It is assumed that a one cycle negative error is suddenly introduced and that in Fig. 1 only the mechanical servo loop is operating. It is further assumed that the 500 to 1 gear train between the shaft of motor 16 and the shaft of the tuning condenser in variable oscillator 17 is so disposed that all of the backlash between input and output shafts must be taken up before the system may begin to eliminate the negative frequency error. The error may be introduced by increasing suddenly the master frequency F. In the gear mechanism of Fig. 1, ten minutes of backlas exist between the condenser rotor and the motor shaft. Consequently 500 times ten minutes exists in the reverse sense between the motor and condenser shaft. In other words, if the motor shaft is locked, the backlash that is measurable at the condenser shaft is ten minutes, while, if the condenser shaft is locked, 500 times ten minutes is measurable at the motor shaft, by virtue of the 500 to 1 gear reduction. This is the angle that will have to be moved through by the motor shaft before correction may begin. In this example, it amounts to approximately 83 degrees.

Starting with the servo in balance, a negative one cycle error is suddenly introduced. At this instant only frequency discriminator 13 will contribute energizing voltage for the servo, as no phase shift has yet developed between the phase discriminator inputs. The slope of the frequency discriminator characteristic is .4 volt per kilocycle, and therefore $E_f=.0004$ volt under the circumstances. In the presence of bearing friction, this voltage is too small to cause rotation of the motor shaft. With the passage of time, however, the voltage $E_p$ develops at the phase discriminator output. The phase shift increment caused by the one cycle frequency error is simply $2\pi t$ radians, where $t$ totals time. As the phase discriminator slope, expressed in volts per radian, is $$\frac{4}{\pi}$$

$$E_p \text{ equals } (2\pi t)\cdot\left(\frac{4}{\pi}\right) \text{ volts}$$

or $E_p=8t$ volts. $E_f+E_p=.0004+8t$. Since the $E_f$ component is negligible, the servo motivating voltage may be considered to be $8t$ volts.

The next problem is whether the backlash between motor and condenser shafts will be taken up before the phase shift between the discriminator inputs exceeds the range of phase discriminator 14. This will depend upon the length of time required to absorb the backlash. Therefore, it is desirable to construct a relation between the motion of the motor shaft and the voltage $E_f+E_p$. To do so, the relation between $E_f+E_p$ and the stall torque output of the servo amplifier may be considered. The stall torque is the torque which would be measured at the motor shaft with the shaft locked. With error voltage converter 18 in balance, the stall torque of motor 16 is zero. From the known constants of the circuit of Fig. 1, if $E_f+E_p$ is increased by .5 volt from the condition of balance, the maximum rated torque of the motor is developed (198 gram centimeter in the example shown in Fig. 1). The stall torque attributable to deviation from balance is then $$\frac{198}{.5}$$

(magnitude of unbalance voltage). Since the voltage $E_f+E_p$ represents the converter unbalance, a stall torque is equal to $396\cdot(8t)$.

It should be noted that it is not the stall torque which motivates the servo while the motor shaft is rotating. When the motor shaft rotates, the running torque, which is less than the stall torque, is controlling. The relation, however, between the running torque and $E_f+E_p$ is complicated for an alternating-current inductor motor under the conditions of its use in servo systems. Therefore, although some error is involved, stall torque is treated as being responsible for the shaft motion. The transit time for the backlash angle computed on this basis will actually be less than what would be computed using the correct, but more complex, expression, and the result will therefore tend unduly to favor the servo. However, since deficiencies of the servo are under consideration, an assumption which is favorable to the servo may reasonably be taken if it simplifies the analysis.

In the system shown in Fig. 1, the moment of inertia at the motor shaft may be considered by way of example, to be 9.5 gram centimeters squared. The equation of motion of the motor shaft is therefore $$396(8t)=9.5\frac{d^2\theta}{dt^2}$$

where $\theta$ is the angular motor shaft displacement from the initial position. This equation may be used as a basis for estimating the angle moved through by the motor shaft in the time interval which elapses between the beginning of the shaft motion and the instant that the end of the usable range of the phase discriminator curve is reached. As the rest point on the phase discriminator characteristic in the system illustrated is at 108 degrees, only 72 degrees of phase shift is permissible before the end of the range is reached. To determine how long it will take to develop a phase shift of 72 degrees between the phase discriminator inputs, there may be equated $$2\pi t_1=72\left(\frac{\pi}{180}\right)$$

and $t_1=.2$ second. Next the differential equation is solved and the angular displacement of the motor shaft taking place in .2 second is computed. If this is less than the 83 degree motor-condenser backlash angle, slave oscillator synchronism will have been lost. The solution of the differential equation is $\theta=3200\ t^3$. At $t=t_1=.2$ second, $\theta_1=3200\ (.2)^3=25.6$ degrees.

In order to avoid loss of synchronism it is necessary that within .2 second the motor shaft move 83 degrees. Since, in the present example, the rotation is only 25.6 degrees, synchronism is lost at the instant the operating point on the phase discriminator curve reaches 180 degrees, which will occur at $t=.2$ second. In other words, before the gears can enmesh, the function $\int_0^t \epsilon dt$ falls outside of the allowable limits and loss of synchronism occurs.

In the system shown in Fig. 6A, if a linear transducer is used some relief from the effects of backlash is possible if the fact that the servo will tolerate some error in the static condition is capitalized upon. If the loop amplification in the servo is reduced, the kinetic energy imparted to the moving members during backlash take-up may be reduced to the point where frictional damping is sufficient to prevent oscillation. Friction brakes are occasionally used to increase the damping factor. The penalty for removing oscillations in this manner is considerable but may be tolerated in a crude servo. The static error is increased and the unfavorable ratio of loop gain to friction makes the servo sluggish, increasing the dynamic error as well.

The present invention renders unnecessary any such compromise with accuracy in the automatic frequency control system of Fig. 1, where exceedingly close control of the slave frequency is required. The designated grade of accuracy is obtained, with the slave frequency being controlled with zero error, by the use of phase as well as frequency sensitive transducer elements. The phase discriminator output is static, i. e., not varying with time, only when the error of the slave frequency is zero. This is evident from the nature of the phase discriminator output voltage. Given sufficient time, the function $K_2\int_0^t \epsilon dt$ grows to a value large enough to actuate servomotor 16 no matter how small $\epsilon$ may be. Consequently, it is impossible for the servo to be static if any error at all exists in the mechanical servo loop. In other words, no amount of rearranging servo loop amplification or increasing friction will remove instability caused by backlash.

The mechanical servo loop of the slave oscillator of Fig. 1 is inoperative by itself, because its inherent backlash prevents the continual control of the slave frequency with zero error. The present invention renders the system operative.

Both types of backlash-induced instabilities, backlash oscillation and run-off of the transducer characteristic, are caused by the opening of the mechanical servo loop during the time intervals necessary to take up backlash. During traverses of the backlash angle, the mechanical servo loop exhibits its open loop behavior, and while control information is present at the transducer output, it is momentarily not acting to reduce the error. In accordance with a feature of the present invention, a continuously acting backlash-free electronic control loop is placed around the frequency error. Since this control is continuously acting, even during intervals when the mechanical servo loop is opened, the function $\int_0^t \epsilon dt$ will tend to be held within bounds and the slave oscillator will not fall out of synchronism every time backlash is absorbed in the mechanical servo loop.

A specific example with reference to the slave oscillator shown in Fig. 1 may be considered. When a one cycle error is imposed with the whole circuit operative, i. e., with both electronic and mechanical loops closed, the result differs from that shown in the previous example in which the electronic loop was considered to be open. In the present example, the electronic control loop reacts almost instantly to the frequency error and eliminates it before the mechanical loop has had a chance to respond. To eliminate the error a voltage is developed at the output of phase discriminator 14 which is of sufficient magnitude to change the slave frequency one cycle. With a reactance tube sensitivity of 175 kilocycles per volt, $$\frac{1}{175}$$

millivolt is required. The resulting unbalance at error voltage converter 18 is so small that the shaft of motor 16 will not shift its angular position. However, because the electronic control loop has acted to remove the frequency error it need not move. Equilibrium exists.

Had a thousand cycle error suddenly been introduced with both loops operative, the voltage at the input of converter 18 would, for example, have risen to 5.7 millivolts. This would be large enough to cause the motor shaft to rotate. The motor shaft would turn in the direction to remove the servo strain, i. e., to return the input voltage of error converter 18 to the value at which the servomotor torque is zero. As the frequency error would very quickly be reduced to zero by the electronic loops the phase discriminator voltage would not increase with time as it did in the previous example.

The electronic control loop stabilizes the servo because it insures a negative feedback connection around the error at all times. With the electronic loop open, the negative feedback connection is broken whenever backlash is being taken up in the mechanical servo loop. When the electronic loop is closed, such interruption is avoided because the electronic loop operates continuously to exert a frequency correction during the instants when backlash breaks the continuity of the mechanical servo loop. In this way the servo is prevented from running in an essentially open-looped condition during backlash traverses, with the attendant dangers of oscillation and run-off of the transducer characteristic. The examples given above show that for the identical initial error condition, slave oscillator synchronization is lost during the period of backlash absorption when the electronic loop is open but is maintained when the electronic control loop is closed.

Thus there is, in effect, an important relation between the electronic and mechanical loops. It has been shown that backlash in a mechanical servo having integration of error renders the servo inoperative because of the inability of the servo to set the slave frequency with infinite precision from the shaft of the servomotor. Consequently, when the electronic control loop of the slave oscillator of Fig. 1 is opened, the over-all servo is disabled. The combination of the electronic and mechanical control loops in accordance with the present invention renders the slave oscillator operative.

Furthermore, it should be recognized that the employment of jointly acting electronic and mechanical loops in the slave oscillator of Fig. 1 is not predicated on any speed defect of the mechanical loop. If zero-backlash gear reductions were available (and such devices are mathematical fictions), the use of an electronic control loop would not have been necessary. In such a case, a sound approach would have been to construct a mechanical servo with the required response rate. In the system shown in Fig. 1, the mechanical frequency control is incapable of performing the function of automatic frequency control alone because of inherent backlash in the mechanical elements.

To recapitulate, it has been indicated above that methods of mitigating the effects of backlash are known when static error may be tolerated. These methods take the form of viscous damping, tachometer feedback, magnetic braking, and reduction of loop gain. With the exception of the last, the purpose of these methods is to apply damping to the servomotor shaft and thus to snuff out oscillation. The penalty paid is higher static error and increased dynamic error.

It has also been indicated that these mitigations are not available for use in the slave oscillator shown in Fig. 1 because of the requirement of zero error control of the slave frequency. Unless the frequency error is precisely zero (and backlash prevents the attainment of such a condition), in time the integral of the error voltage becomes sufficient to actuate the motor. If the backlash angle is then traversed, run-off of the transducer characteristic will occur. If friction devices were applied to the motor shaft, the time of transit of the backlash angle would actually increase. Thus, the integral of the frequency error would grow larger than if such braking devices were not employed.

The present invention deals with the problem of backlash-induced instability at its source. In contrast, the methods which may be used when static error is permissible affect only the symptoms. The difficulty arises because the mechanical servo loop is opened during backlash absorption. By placing an electronic control loop around the voltage error, closed circuit control is assured even when the mechanical servo loop is opened.

The other principal feature of the present invention is the simple method used to make the slave oscillator of Fig. 1 seek its own lock-in frequency. It will be noted that if error voltage converter 18 (shown in detail in Fig. 5) is balanced to yield zero alternating-current output for zero direct-current input, then when the master and slave frequencies are out of synchronism there is no corrective voltage output from the discriminators 13 and 14, and motor 16 is stationary. However, as has been noted, converter 18 is balanced so that the alternating-current output vanishes when the direct-current input is at .4 volt rather than zero. Thus, an alternating-current signal is supplied to servo motor 16 when there is no synchronism, causing the frequency range of the slave oscillator to be swept. The sweep is maintained until the slave oscillator is tuned to the lock-in frequency of the electronic control loop. At the instant of synchronism, the mechanical servo begins operating and quickly draws the point of operation on the phase discriminator characteristic to the value (.4 volt) at which the converter is in balance.

It is to be understood that the above-described arrangements are illustrative of the application of the principles of the invention. Numerous other arrangements may be devised by those skilled in the art without departing from the spirit and scope of the invention.

What is claimed is:

1. An automatic frequency control system for maintaining a predetermined difference between a controlled frequency and a reference frequency which comprises a mixer to produce a frequency equal to the difference between the controlled and reference frequencies, a frequency discriminator to determine any departure of the difference frequency from he predetermined amount and transform the error into a corresponding direct voltage, a phase discriminator to determine any departure of the difference frequency from the predetermined amount and generate a direct voltage which increases with time as long as the error persists, means to combine the outputs of said frequency and phase discriminators into a single direct error voltage, a mechanically tuned variable oscillator, an electrically tuned variable oscillator, a mixer to produce the controlled frequency as the difference between the frequencies generated by the two said variable oscillators, an alternating-current servomotor to regulate the frequency of said mechanically tuned oscillator under the control of the direct error voltage, gear reduction means coupled between the shaft of said motor and said mechanically tuned oscillator, an error voltage converter to change the direct error voltage into a corresponding alternating voltage, and a reactance tube to regulate the frequency of said electrically tuned variable oscillator under the control of the direct error voltage and prevent the introduction of instability by backlash in said gear reduction means.

2. An automatic frequency control system for maintaining a predetermined difference between a controlled frequency and a reference frequency which comprises a mixer to produce a frequency equal to the difference between the controlled and reference frequencies, a frequency discriminator to determine any departure of the difference frequency from the predetermined amount and transform the error into a corresponding direct voltage, a phase discriminator to determine any departure of the difference frequency from the predetermined amount and generate a direct voltage which increases with time as long as the error persists, means to combine the outputs of said frequency and phase discriminators into a single direct error voltage, a mechanically tuned variable oscillator, an electrically tuned variable oscillator, a mixer to produce the controlled frequency as the difference between the frequencies generated by the two said variable oscillators, an alternating-current servomotor to regulate the frequency of said mechanically tuned oscillator under the control of the direct error voltage, gear reduction means coupled between the shaft of said motor and said mechanically tuned oscillator, an error voltage converter to change the direct error voltage into a corresponding alternating voltage, said error voltage converter being balanced to yield an alternating-current signal even in the absence of a direct error voltage, whereby the system is made automatically to seek synchronism whenever the error is outside of the range of said phase discriminator, and a reactance tube to regulate the frequency of said electrically tuned variable oscillator under the control of the direct error voltage and prevent the introduction of instability by backlash in said gear reduction means.

3. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a direct voltage substantially proportional thereto, means to detect any departure of the controlled and reference frequencies from said predetermined relation and transform the error into a direct voltage which increases with time as long as an error persists, means to combine the outputs of said two error detecting means into a single direct error voltage, a mechanically tuned variable oscillator, an electrically tuned variable oscillator, a mixer to produce the controlled frequency as the difference between the frequencies generated by the two said variable oscillators, an alternating-current servomotor to regulate the frequency of said mechanically tuned oscillator under the control of the direct error voltage, gear reduction means coupled between the shaft of said motor and said mechanically tuned oscillator, an error voltage converter to change the direct error voltage into a corresponding alternating voltage, and a reactance tube to regulate the frequency of said electrically tuned oscillator under the control of the direct error voltage and prevent the introduction of instability by backlash in said gear reduction means.

4. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a direct voltage substantially proportional thereto, means to detect any departure of the controlled and reference frequencies from said predetermined relation and transform the error into a direct voltage which increases with time as long as an error persists, means to combine the outputs of said two error detecting means into a single direct error voltage, a mechanically tuned variable oscillator, an electrically tuned variable oscillator, a mixer to produce the controlled frequency as the difference between the frequencies generated by the two said variable oscillators, an alternating-current servomotor to regulate the frequency of said mechanically tuned oscillator under the control of the direct error voltage, gear reduction means coupled between the shaft of said motor and said mechanically tuned oscillator, an error voltage converter to change the direct error voltage into a corresponding alternating voltage, said error voltage converter being balanced to yield an alternating-current signal even in the absence of a direct error voltage, whereby the system is made automatically to seek synchronism whenever the error is outside of the range of either of said error detecting means, and a reactance tube to regulate the frequency of said electrically tuned variable oscillator under the control of the direct error voltage and prevent the introduction of instability by backlash in said gear reduction means.

5. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a direct voltage, a mechanically tuned variable oscillator, an electrically tuned variable oscillator, means to produce a frequency equal to the difference between the frequencies generated by the two said variable oscillators, the frequency produced by said last-mentioned means being the controlled frequency, an alternating-current servomotor to regulate the frequency of said mechanically tuned oscillator under the control of the direct error voltage, gear reduction means coupled between the shaft of said motor and said mechanically tuned oscillator, an error voltage converter to change the direct error voltage into a corresponding alternating voltage, and a reactance tube to regulate the frequency of said electrically tuned oscillator under the control of the direct error voltage and prevent the introduction of instability by backlash in said gear reduction means.

6. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a direct voltage, a mechanically tuned variable oscillator, an electrically tuned variable oscillator, means to produce a frequency equal to the difference between the frequencies generated by the two said variable oscillators, the frequency generated by said last-mentioned means being the controlled frequency, an alternating-current servomotor to regulate the frequency of said mechanically tuned oscillator under the control of the direct error voltage, gear reduction means coupled between the shaft of said motor and said mechanically tuned oscillator, an error voltage converter to change the direct error voltage into a corresponding alternating voltage, said error voltage converter being balanced to yield an alternating-current signal even in the absence of a direct error voltage, whereby the system is made automatically to seek synchronism whenever the error is outside of the range of said error detection means, and a reactance tube to regulate the frequency of said electrically tuned oscillator under the control of the direct error voltage and prevent the introduction of instability by backlash in said gear reduction means.

7. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a corresponding direct error voltage, a mechanically tuned variable oscillator, an electrically tuned variable oscillator, means to produce the controlled frequency as the difference between the frequencies generated by the two said variable oscillators, a servomotor to regulate the frequency of said mechanically tuned oscillator under the control of the direct error voltage, gear reduction means coupled between the shaft of said motor and said mechanically tuned oscillator, and a reactance tube to regulate the frequency of said electrically tuned oscillator under the control of the direct error voltage and prevent the introduction of instability by backlash in said gear reduction means.

8. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a corresponding error voltage, a mechanically tuned vaiable oscillator, an electrically tuned variable oscillator, means to combine the outputs of the two said variable oscillators and produce an output frequency equal to the difference between the frequencies generated by the two said variable oscillators, the output frequency being the controlled frequency, a servomotor to regulate the frequency of said mechanically tuned oscillator under the control of the error voltage, gear reduction means coupled between the shaft of said motor and said mechanically tuned oscillator, and a reactance tube to regulate the frequency of said electrically tuned oscillator under the control of the error voltage and prevent the introduction of instability by backlash in said gear reduction means.

9. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a voltage substantially proportional thereto, means to detect any departure of the controlled and reference frequencies from said predetermined relation and transform the error into a voltage which increases with time as long as an error persists, means to combine the outputs of said two error detecting means into a single error voltage, a mechanically tuned variable oscillator, an electrically tuned variable oscillator, means to combine the outputs of the two said variable oscillators and produce an output frequency equal to the difference between the frequencies generated by the two said variable oscillators, the output frequency being the controlled frequency, a servo motor to regulate the frequency of said mechanically tuned oscillator under the control of the error signal, gear reduction means coupled between the shaft of said motor and said mechanically tuned oscillator, and a reactance tube to regulate the frequency of said electrically tuned oscillator under the control of the error signal and prevent the introduction of instability by backlash in said gear reduction means.

10. An automatic frequency control system for maintaining a predetermined difference between a controlled frequency and a reference frequency which comprises a mixer to produce a frequency equal to the difference between the controlled and reference frequencies, a frequency discriminator to detect any departure of the difference frequency from a predetermined amount and transform the error into a corresponding direct voltage, a phase discriminator to detect any departure of the difference frequency from a predetermined amount and generate a direct voltage which increases with time as long as the error persists, means to combine the outputs of said frequency and phase discriminators into a single direct error voltage, a mechanically tuned variable oscillator, an electrically tuned variable oscillator, a mixer to produce a frequency equal to the difference between the frequencies generated by the two said variable oscillators, the output frequency being the controlled frequency, a servo motor to regulate the frequency of said mechanically tuned oscillator under the control of the direct error voltage, gear reduction means coupled between the shaft of said motor and said mechanically tuned oscillator, and a reactance tube to regulate the frequency of said electrically tuned oscillator under the control of the direct error voltage and prevent the introduction of instability by backlash in said gear reduction means.

11. An automatic frequency control system for maintaining a predetermined relation between a controlled frequency and a reference frequency which comprises means to compare the controlled and reference frequencies, means to detect any departure of the controlled and reference frequencies from said predetermined relation and transform the error into a direct voltage, an alternating-current servomotor to regulate the controlled frequency under the control of the direct error voltage and an error voltage converter to change the direct error voltage into a corresponding alternating voltage for application to said servomotor, said error voltage converter being balanced to yield an alternating voltage even in the absence of a direct error voltage, whereby the system is made automatically to seek synchronism whenever the error is outside of the range of said error detecting means.

12. A servo system for maintaining a predetermined relation between a controlled quantity and a reference quantity which comprises means to compare the controlled and reference quantities, means to detect any departure of the controlled and reference quantities from said predetermined relation and transform the error into a direct voltage, an alternating-current servomotor to regulate the controlled quantity under the control of the direct error voltage an error voltage converter to change the direct error voltage into a corresponding alternating voltage for application to said servomotor, said error voltage converter being balanced to yield an alternating voltage even in the absence of a direct error voltage, whereby the system is made automatically to seek synchronism whenever the error is outside of the range of said error detecting means.

References Cited in the file of this patent

UNITED STATES PATENTS

| | | |
|---|---|---|
| 2,379,689 | Crosby | July 3, 1945 |
| 2,404,852 | Koch | July 30, 1946 |
| 2,464,818 | Learned | Mar. 22, 1949 |
| 2,511,137 | Wheeler | June 13, 1950 |
| 2,541,454 | White | Feb. 13, 1951 |
| 2,567,896 | Semm | Sept. 11, 1951 |
| 2,588,742 | McCallum | Mar. 11, 1952 |
| 2,588,743 | McCallum | Mar. 11, 1952 |
| 2,605,425 | Hugenholtz | July 29, 1952 |